(12) United States Patent
Zhou

(10) Patent No.: US 11,820,304 B2
(45) Date of Patent: Nov. 21, 2023

(54) MODULAR DESIGN STRUCTURE OF IN-VEHICLE ELECTRICAL APPLIANCES

(71) Applicant: Hangzhou Baiyu Technology Co., Ltd., Hangzhou (CN)

(72) Inventor: Yong Zhou, Longquan (CN)

(73) Assignee: HANGZHOU BAIYU TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/670,757

(22) Filed: Feb. 14, 2022

(65) Prior Publication Data

US 2023/0192016 A1    Jun. 22, 2023

(30) Foreign Application Priority Data

Dec. 17, 2021    (CN) .......................... 202111548088.7

(51) Int. Cl.
| | |
|---|---|
| *B60R 16/033* | (2006.01) |
| *H01M 50/204* | (2021.01) |
| *H01M 50/247* | (2021.01) |
| *B60R 16/04* | (2006.01) |
| *H01M 10/42* | (2006.01) |

(52) U.S. Cl.
CPC ............ *B60R 16/033* (2013.01); *B60R 16/04* (2013.01); *H01M 10/425* (2013.01); *H01M 50/204* (2021.01); *H01M 50/247* (2021.01); *H01M 2220/30* (2013.01)

(58) Field of Classification Search
CPC .... B60R 16/033; B60R 16/04; H01M 50/247; H01M 50/204; H01M 10/425; H01M 2220/30
USPC .................................................. 307/9.1, 10.1
See application file for complete search history.

(56) References Cited

U.S. PATENT DOCUMENTS

| | | | |
|---|---|---|---|
| 2016/0322844 A1* | 11/2016 | Pickens ............... | H01M 50/298 |
| 2021/0002170 A1* | 1/2021 | Chien .................... | H05B 45/30 |
| 2022/0115882 A1* | 4/2022 | Clark .................. | H01M 10/486 |

* cited by examiner

*Primary Examiner* — Rexford N Barnie
*Assistant Examiner* — Swarna N Chowdhuri
(74) *Attorney, Agent, or Firm* — WPAT, P.C

(57) ABSTRACT

A modular design structure of in-vehicle electrical appliances includes: a mobile power supply and a detachable device. The mobile power supply is disposed with an input interface and an output interface for power input and output, internally disposed with a power battery pack and a circuit control board and disposed with a mounting part including a top cover, a side wall of the top cover is disposed with a snap structure, an end of the top cover is disposed with current output contacts. The detachable device includes electrical modules each with a connecting part including a bottom cover, a side wall of the bottom cover is disposed with a notch matching with the snap structure, an end of the bottom cover is disposed with current input contacts matching with the current output contacts. Through modular design, the vehicle electrical appliance is smaller and convenient to carry.

8 Claims, 2 Drawing Sheets

… (1)

MODULAR DESIGN STRUCTURE OF IN-VEHICLE ELECTRICAL APPLIANCES

FIELD OF THE DISCLOSURE

The disclosure relates to the field of in-vehicle electrical appliance technologies, and more particularly to a modular design structure of in-vehicle electrical appliances.

BACKGROUND OF THE DISCLOSURE

With the development of social economy and automobile industry, many vehicles have set up vehicle electrical appliances in order to provide passengers with a more comfortable experience during the journey.

However, most of the existing vehicle electrical appliances are powered by connecting the battery of the vehicle itself. If multiple vehicle electrical appliances are connected, there will be connecting wires of multiple appliances, which is not easy to use, and multiple vehicle electrical appliances will occupy more space and not convenient for storage.

SUMMARY OF THE DISCLOSURE

An objective of an embodiment of the disclosure is to provide a modular design structure of vehicle electrical appliances, which aims to solve the problem that most of the existing vehicle electrical appliances are powered by connecting a battery of a vehicle itself. If multiple vehicle electrical appliances are connected, there will be the connecting wires of multiple electrical appliances, which is not convenient for use, and multiple vehicle electrical appliances will occupy more space and not convenient for storage.

The embodiment of the disclosure is realized in this way. A modular design structure of vehicle electrical appliances includes:

a mobile power supply disposed with an input interface and an output interface for power input and output, internally disposed with a power battery pack and a circuit control board, further disposed with a mounting part; the mounting part includes a top cover, a side wall of the top cover is disposed with a snap structure, and an end of the top cover is disposed with current output contacts; and a detachable device including electrical modules each with a connecting part, the connecting part includes a bottom cover, a side wall of the bottom cover is disposed with a notch matching with the snap structure, and an end of the bottom cover is disposed with current input contacts matching with the current output contacts.

In an embodiment, the electrical modules include an inflation pump, a dust collector, a strong lighting lamp, an air purifier, a vehicle washer and a mobile phone supporter.

In an embodiment, the mobile power supply is disposed with a power switch configured for controlling an on-off state of a circuit.

In an embodiment, the input interface is a type-C input interface.

In an embodiment, the output interface is a USB output interface.

In an embodiment, a rated voltage of the power battery pack is 12V.

Compared with the related art, the embodiments of the disclosure may mainly have the following beneficial effects.

The embodiment of the disclosure provides the modular design structure of the vehicle electrical appliances, which can be used to make the existing vehicle electrical appliances smaller in size while satisfying their functions through a modular design, and can be powered by the mobile power supply, and at the same time, the mobile power supply can be rotated and combined with various other modules into one, and provide power support for these modules. It makes these vehicle electrical appliances become wireless and no longer rely on on-board power supply. In addition, all products share a power battery module, which reduces the use of lithium batteries and achieves the role of energy conservation and emission reduction. Moreover, the modular design reduces the weight, volume and production cost of the product, making the storage volume of the whole product series smaller and convenient to carry.

DESCRIPTION OF REFERENCE NUMERALS

Figure 1:
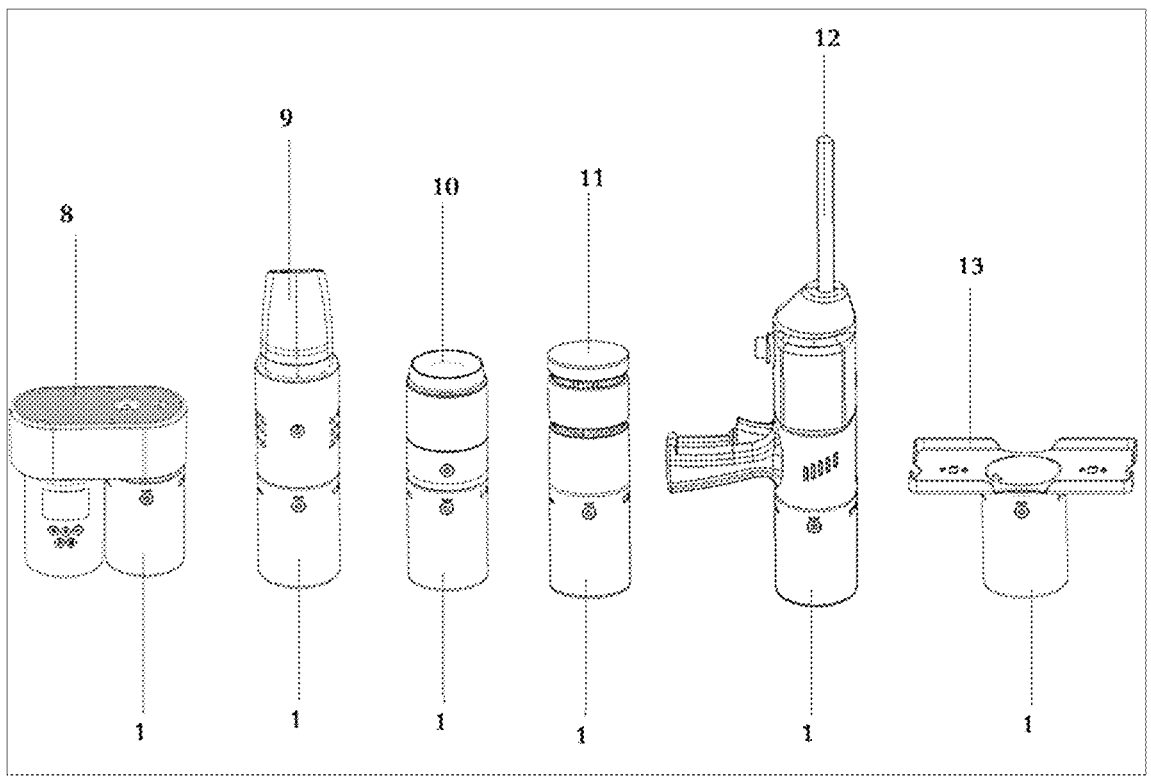
FIG. 1 is a schematic structural diagram of a modular design structure of vehicle electrical appliances provided by an embodiment of the disclosure.

Mobile power supply 1; Top cover 2; Snap structure 3; Power switch 4; Current output contact 5; Input interface 6; Output interface 7; Inflation pump 8; Dust collector 9; Strong lighting lamp 10; Air purifier 11; Vehicle washer 12; Mobile phone supporter 13; Bottom cover 20; Notch 21; Current input contact 22.

DETAILED DESCRIPTION OF EMBODIMENTS

In order to make an objective, technical solution and advantages of the disclosure clearer, the disclosure is further described in detail below in combination with the accompanying drawings and the embodiment. It should be understood that the specific embodiment described herein are only used to explain the disclosure and are not used to limit the disclosure.

The specific implementation of the disclosure is described in detail below in combination with the specific embodiment.

Figure 2:
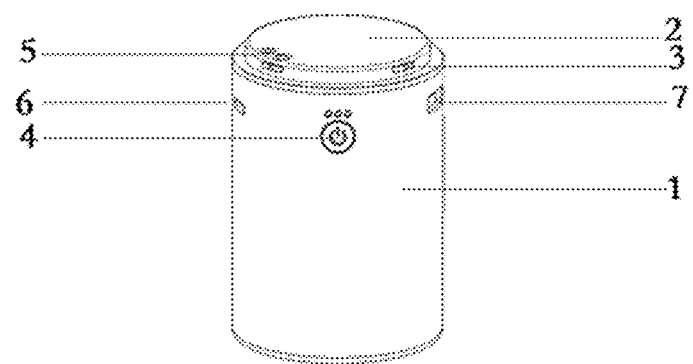
FIG. 2 is a schematic structural diagram of a mobile power supply in the modular design structure of the vehicle electrical appliances provided by the embodiment of the disclosure.
Figure 3:
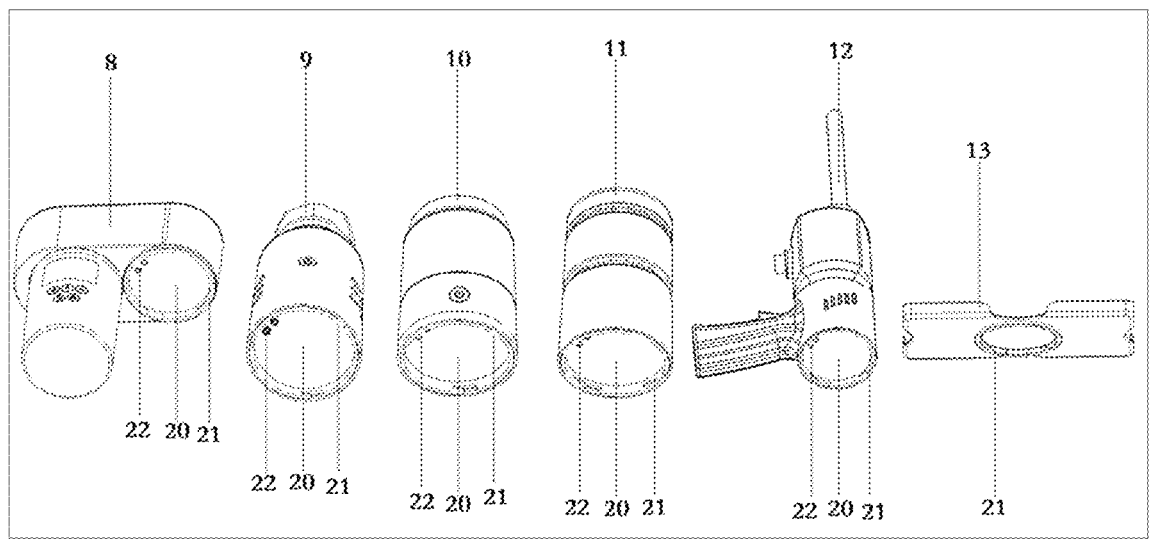
FIG. 3 is a schematic structural diagram of each working module in the modular design structure of the vehicle electrical appliances provided by the embodiment of the disclosure.

Referring to FIGS. 1-3, a modular design structure of vehicle electrical appliances provided for an embodiment of the disclosure includes: a mobile power supply 1 (also referred to as a mobile power supply module, or portable power supply, or portable power supply module) and a detachable device.

The mobile power supply 1 is disposed with an input interface 6 (e.g., input port) and an output interface 7 (e.g., output port) and configured for power input and output. The mobile power supply 1 is internally disposed with a power battery pack and a circuit control board. The mobile power supply 1 is also disposed with a mounting part. The mounting part includes a top cover 2, a side wall of the top cover 2 is disposed with a snap structure 3, and an end of the top cover 2 is disposed with current output contacts 5.

The detachable device includes electrical modules each with a connecting part, the connecting part includes a bottom cover 20, a side wall of the bottom cover 20 is disposed with a notch 21 matching with the snap structure 3, and an end of the bottom cover 20 is disposed with current input contacts 22 matching with the current output contacts 5.

The electrical modules include an inflation pump 8 (also referred to as an inflation pump module), a dust collector 9 (also referred to as a dust collecting module, or vacuum cleaner), a strong lighting lamp 10 (also referred to as a strong lighting module), an air purifier 11 (also referred to as an air purify), a vehicle washer 12 (also referred to as a vehicle washing module, or vehicle washing machine) and a mobile phone supporter 13 (also referred to as a mobile phone supporting module, or mobile phone holder).

In the embodiment of the disclosure, the electrical modules include multiple working modules, which include the inflation pump 8, the dust collector 9, the strong lighting lamp 10, the air purifier 11, the vehicle washer 12, the mobile phone supporter 13, etc.

The power battery pack with 12 volts (V) of rated voltage and the circuit control board are built in the mobile power supply 1 of this product. The mobile power supply 1 can be rotationally connected to the modules such as the inflation pump 8, the dust collector 9, the strong lighting lamp 10, the air purifier 11, the vehicle washer 12 and the mobile phone supporter 13 through the top cover 2 and bottom cover 20 of the above modules, connected by the snap structure 3 slides into the notch 21 and then rotate and lock, the current output contacts 5 on the top cover 2 contact the current input contacts 22 on the bottom cover 20 of each module after connection, so that the mobile power supply 1 provides power support for the modules.

Moreover, the mobile power supply 1 is disposed with a power switch 4 configured for controlling opening and closing of a circuit, and the input interface 6 is configured to charge the internal power battery pack. The output interface 7 is configured to output voltages such as 5V/9V/12V through an internal intelligent step-down chip to supply power to various digital devices. The voltage of each of the current output contacts 5 is 12V, and the following modules are also 12V: the inflation pump 8, the dust collector 9, the strong lighting lamp 10, the air purifier 11 and the vehicle washer 12.

The above is only a preferred embodiment of the disclosure and is not intended to limit the disclosure. Any modifications, equivalent replacements and changes made within the spirit and principles of the disclosure shall be included in the protection scope of the disclosure.

What is claimed is:

1. A modular design structure of in-vehicle electrical appliances, comprising:
    a mobile power supply, disposed with an input interface and an output interface and configured for power input and output, internally disposed with a power battery pack and a circuit control board, and further disposed with a mounting part; and
    a detachable device, comprising a plurality of electrical modules with one or more functions, wherein each of the plurality of electrical modules is detachably connected to the mobile power supply through a connecting part arranged thereon;
    wherein the mounting part comprises a top cover, the top cover comprises a top surface and a first side wall surrounding the top surface, the top surface is disposed with current output contacts, and an outside of the first side wall is disposed with a snap structure;
    the connecting part comprises a bottom cover disposed on the electrical module, the bottom comprises a bottom surface and a second side wall surrounding the bottom surface, the bottom surface is disposed with current input contacts, an inside of the second side wall is disposed with a notch; and
    the bottom cover defines an opening facing toward the bottom surface, the top cover is configured to insert into the bottom cover through the opening, thereby making the bottom cover be sleeved on an outside of the top cover, the current output contacts be in contact with the current input contacts and the snap structure be snapped into the notch;
    wherein the plurality of electrical modules comprises an inflation pump, a dust collector, a lighting lamp, an air purifier, a vehicle washer and a mobile phone supporter.

2. The modular design structure according to claim 1, wherein the mobile power supply is further disposed with a power switch configured for controlling on-off states of a circuit.

3. The modular design structure according to claim 1, wherein a rated voltage of the power battery pack is 12 volts (V).

4. The modular design structure according to claim 1, wherein the output interface is a universal serial bus (USB) output interface.

5. The modular design structure according to claim 1, wherein the input interface is a type-C input interface.

6. The design structure according to claim 1, wherein the bottom surface is directly in contact with the top surface, and the second side wall is directly in contact with the first side wall.

7. A modular design structure of in-vehicle electrical appliances, comprising:
    a mobile power supply, disposed with an input interface and an output interface and configured for power input and output, internally disposed with a power battery pack and a circuit control board;
    a detachable device, comprising a plurality of electrical modules with one or more functions;
    wherein the mobile power supply comprises a top cover, a first side wall and a top surface of the top cover are enclosed into a stepped portion, a snap structure is arranged on a periphery of the stepped portion, and current output contacts are arranged on the top surface of the stepped portion;
    the detachable device comprises a bottom cover disposed on one of the plurality of electrical modules, the bottom cover comprises a bottom surface and a second side wall surrounding the bottom surface, the bottom surface is disposed with current input contacts, an inside of the second side wall is disposed with a notch; and
    the bottom cover defines an opening facing toward the bottom surface, the stepped portion is configured to insert into the bottom cover through the opening, thereby making the bottom cover be sleeved on the periphery of the stepped portion, the current output contacts be in contact with the current input contacts and the snap structure be snapped into the notch;
    wherein the plurality of electrical modules comprises an inflation pump, a dust collector, a lighting lamp, an air purifier, a vehicle washer and a mobile phone supporter.

8. The design structure according to claim 7, wherein the bottom surface is directly in contact with the top surface, and the second side wall is directly in contact with the first side wall.

* * * * *